(12) United States Patent
Bigdeli et al.

(10) Patent No.: US 12,007,791 B2
(45) Date of Patent: Jun. 11, 2024

(54) MULTI-DRONE/SENSOR PLATFORM WITH INFORMATION LATERALIZATION AND FEDERATED PATH PLANNING

(71) Applicant: Soter Technology Inc, Mission Viejo, CA (US)

(72) Inventors: Sepehre Bigdeli, Mission Viejo, CA (US); Tara Javidi, San Diego, CA (US); Kayvan Alikhani, Berkeley, CA (US)

(73) Assignee: Soter Technology Inc, Mission Viejo, CA (US)

( * ) Notice: Subject to any disclaimer, the term of this patent is extended or adjusted under 35 U.S.C. 154(b) by 261 days.

(21) Appl. No.: 17/317,672

(22) Filed: May 11, 2021

(65) Prior Publication Data

US 2021/0349478 A1    Nov. 11, 2021

Related U.S. Application Data

(60) Provisional application No. 63/023,016, filed on May 11, 2020.

(51) Int. Cl.
| | |
|---|---|
| *G05D 1/00* | (2006.01) |
| *G08G 5/00* | (2006.01) |
| *H04L 67/12* | (2022.01) |

(52) U.S. Cl.
CPC ........... *G05D 1/104* (2013.01); *G05D 1/0088* (2013.01); *G08G 5/0039* (2013.01); *G08G 5/0069* (2013.01); *H04L 67/12* (2013.01)

(58) Field of Classification Search
None
See application file for complete search history.

(56) References Cited

U.S. PATENT DOCUMENTS

| | | |
|---|---|---|
| 9,852,642 B2 | 12/2017 | Butler et al. |
| 10,336,441 B2 | 7/2019 | Kim et al. |
| 10,545,512 B2 | 1/2020 | Boland et al. |

(Continued)

OTHER PUBLICATIONS

Yuan et al, A Hierarchical Vision-Based UAV Localization for an Open Landing, MDPI, electronics, Apr. 11, 2018.

(Continued)

*Primary Examiner* — Amelia Vorce

(57) ABSTRACT

Disclosed herein is a device for facilitating managing of paths for unmanned vehicles. Further, the device is configured to be communicatively coupled with the unmanned vehicles. Further, the device comprises a communication device configured for receiving heterogeneous information from sensors and transmitting commands to unmanned vehicles. Further, the device comprises a processing device communicatively coupled with the communication device. Further, the processing device is configured for integrating the heterogeneous information, generating integrated information based on the integrating, analyzing the integrated information based on paths assigned to the unmanned vehicles for performing a mission, determining an adjustment required to be made in the paths by the plurality of unmanned vehicles, and generating the commands for the unmanned vehicles. Further, the device comprises a storage device communicatively coupled with the processing device. Further, the storage device is configured for storing the paths.

10 Claims, 11 Drawing Sheets

(56) References Cited

U.S. PATENT DOCUMENTS

| | | |
|---|---|---|
| 10,591,910 B2 | 3/2020 | Levinson et al. |
| 10,676,085 B2 | 6/2020 | Smith et al. |
| 10,732,647 B2 | 8/2020 | Shen |
| 10,796,204 B2 | 10/2020 | Rohani et al. |
| 11,479,357 B1* | 10/2022 | Nevdahs ............. G08G 5/0013 |
| 2017/0278406 A1 | 9/2017 | Akselrod et al. |
| 2017/0345317 A1* | 11/2017 | Heinonen .............. G01C 21/20 |
| 2017/0347110 A1 | 11/2017 | Wang et al. |
| 2018/0184073 A1* | 6/2018 | Burgess ................ B64C 39/024 |
| 2018/0213208 A1* | 7/2018 | Guo ..................... G05D 1/0027 |
| 2018/0321680 A1 | 11/2018 | Tu |
| 2018/0357909 A1 | 12/2018 | Eyhorn |
| 2019/0107840 A1 | 4/2019 | Green et al. |
| 2019/0196467 A1 | 6/2019 | Aldana Lopez et al. |
| 2019/0355262 A1 | 11/2019 | Priest |
| 2019/0369641 A1* | 12/2019 | Gillett .................. G05D 1/0027 |
| 2020/0218288 A1* | 7/2020 | Johnson ................ B64U 10/13 |
| 2020/0279367 A1 | 9/2020 | White |
| 2020/0320886 A1* | 10/2020 | Zhou .................... G08G 5/0069 |
| 2021/0073692 A1* | 3/2021 | Saha .................... G06V 10/764 |
| 2022/0066456 A1* | 3/2022 | Ebrahimi Afrouzi ....................... B25J 9/1697 |
| 2022/0334599 A1* | 10/2022 | Johnson ................. G05D 1/106 |
| 2022/0374010 A1* | 11/2022 | Bachrach ............ G06F 3/04883 |

OTHER PUBLICATIONS

Liu et al, Edge-Assisted Hierarchical Federated Learning with Non-IID Data, The Hong Kong University of Science and Technology, May 16, 2019.

* cited by examiner

MULTI-DRONE/SENSOR PLATFORM WITH INFORMATION LATERALIZATION AND FEDERATED PATH PLANNING

The current application claims a priority to the U.S. Provisional Patent application Ser. No. 63/023,016 filed on May 11, 2020.

FIELD OF THE INVENTION

Generally, the present disclosure relates to the field of data processing. More specifically, the present disclosure relates to methods, systems, apparatuses, and devices for facilitating managing of paths for unmanned vehicles.

BACKGROUND OF THE INVENTION

The field of data processing is technologically important to several industries, business organizations, and/or individuals. In particular, the use of data processing is prevalent for managing paths of unmanned vehicles.

Path planning is one of the most researched topics in autonomous robotics. Finding a safe path in a cluttered environment for a mobile robot is an important demand for the success of any such mobile robot project. When it comes to path planning with technology, it can be very difficult due to the complexity of information that is being gathered. One challenge is that majority of path planning methods require knowledge of known areas or environments. The use of path planning can be used in fully known environments, partially known environments, or unknown environments. Depending on if an environment is known or not, the limits and restrictions to what path planning autonomous robots can do may not be optimized.

Therefore, there is a need for improved systems for facilitating the managing of paths for unmanned vehicles that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a device for facilitating managing of paths for unmanned vehicles, in accordance with some embodiments. Further, the device may be configured to be communicatively coupled with the unmanned vehicles. Further, the device may include a communication device configured for receiving a plurality of heterogeneous information from a plurality of sensors associated with a plurality of unmanned vehicles. Further, the plurality of sensors may be configured for generating the plurality of heterogeneous information of an environment from a plurality of field of views of the plurality of sensors. Further, a heterogeneity of the plurality of heterogeneous information may be based on the plurality of field of views. Further, the plurality of field of views may be hierarchically nested based on a hierarchical order of the plurality of unmanned vehicles. Further, the plurality of heterogeneous information may be hierarchically nested based on hierarchical nesting of the plurality of field of views. Further, the communication device may be configured for transmitting a plurality of commands to the plurality of unmanned vehicles. Further, the plurality of unmanned vehicles may be configured for traversing the environment based on the plurality of commands. Further, the plurality of unmanned vehicles may be configured for performing at least one mission based on the traversing. Further, the device may include a processing device communicatively coupled with the communication device. Further, the processing device may be configured for integrating the plurality of heterogeneous information. Further, the processing device may be configured for generating integrated information of the environment based on the integrating. Further, the processing device may be configured for analyzing the integrated information based on a plurality of paths assigned to the plurality of unmanned vehicles for performing the at least one mission. Further, the processing device may be configured for determining an adjustment required to be made in the plurality of paths by the plurality of unmanned vehicles based on the analyzing. Further, the processing device may be configured for generating the plurality of commands for the plurality of unmanned vehicles based on the determining of the adjustment. Further, the device may include a storage device communicatively coupled with the processing device. Further, the storage device may be configured for storing the plurality of paths assigned to the plurality of unmanned vehicles for performing the at least one mission.

Further disclosed herein is a device for facilitating managing of paths for unmanned vehicles, in accordance with some embodiments. Further, the device may be configured to be communicatively coupled with the unmanned vehicles. Further, the device may include a communication device configured for receiving a plurality of heterogeneous information from a plurality of sensors associated with a plurality of unmanned vehicles. Further, the plurality of sensors may be configured for generating the plurality of heterogeneous information of an environment from a plurality of field of views of the plurality of sensors. Further, a heterogeneity of the plurality of heterogeneous information may be based on the plurality of field of views. Further, the plurality of field of views may be hierarchically nested based on a hierarchical order of the plurality of unmanned vehicles. Further, the plurality of heterogeneous information may be hierarchically nested based on hierarchical nesting of the plurality of field of views. Further, a primary field of view of a primary sensor associated with a primary unmanned vehicle of a higher hierarchical order includes a secondary field of view of a secondary sensor associated with a secondary unmanned vehicle of a lower hierarchical order. Further, the primary sensor may be configured for generating primary information of the plurality of heterogeneous information associated with the environment from the primary field of view and the secondary sensor may be configured for generating secondary information of the plurality of heterogeneous information associated with the environment from the secondary field of view. Further, the primary information includes the secondary information based on the hierarchical nesting of the plurality of field of views. Further, the communication device may be configured for transmitting a plurality of commands to the plurality of unmanned vehicles. Further, the plurality of unmanned vehicles may be configured for traversing the environment based on the plurality of commands. Further, the plurality of unmanned vehicles may be configured for performing at least one mission based on the traversing. Further, the device may include a processing device communicatively coupled with the communication device. Further, the processing device may be configured for integrating the plurality of heterogeneous information. Further, the processing device may be configured for generating integrated information of the environment based on the integrating. Further, the processing device may be configured for analyzing the integrated information based on a plurality of paths assigned to the plurality of unmanned vehicles for performing the at least one mission. Further, the processing device may be configured for determining an adjustment required to be made in the plurality of paths by the plurality of unmanned vehicles based on the analyzing. Further, the processing device may be configured for generating the plurality of commands for the plurality of unmanned vehicles based on the determining of the adjustment. Further, the device may include a storage device communicatively coupled with the processing device. Further, the storage device may be configured for storing the plurality of paths assigned to the plurality of unmanned vehicles for performing the at least one mission.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
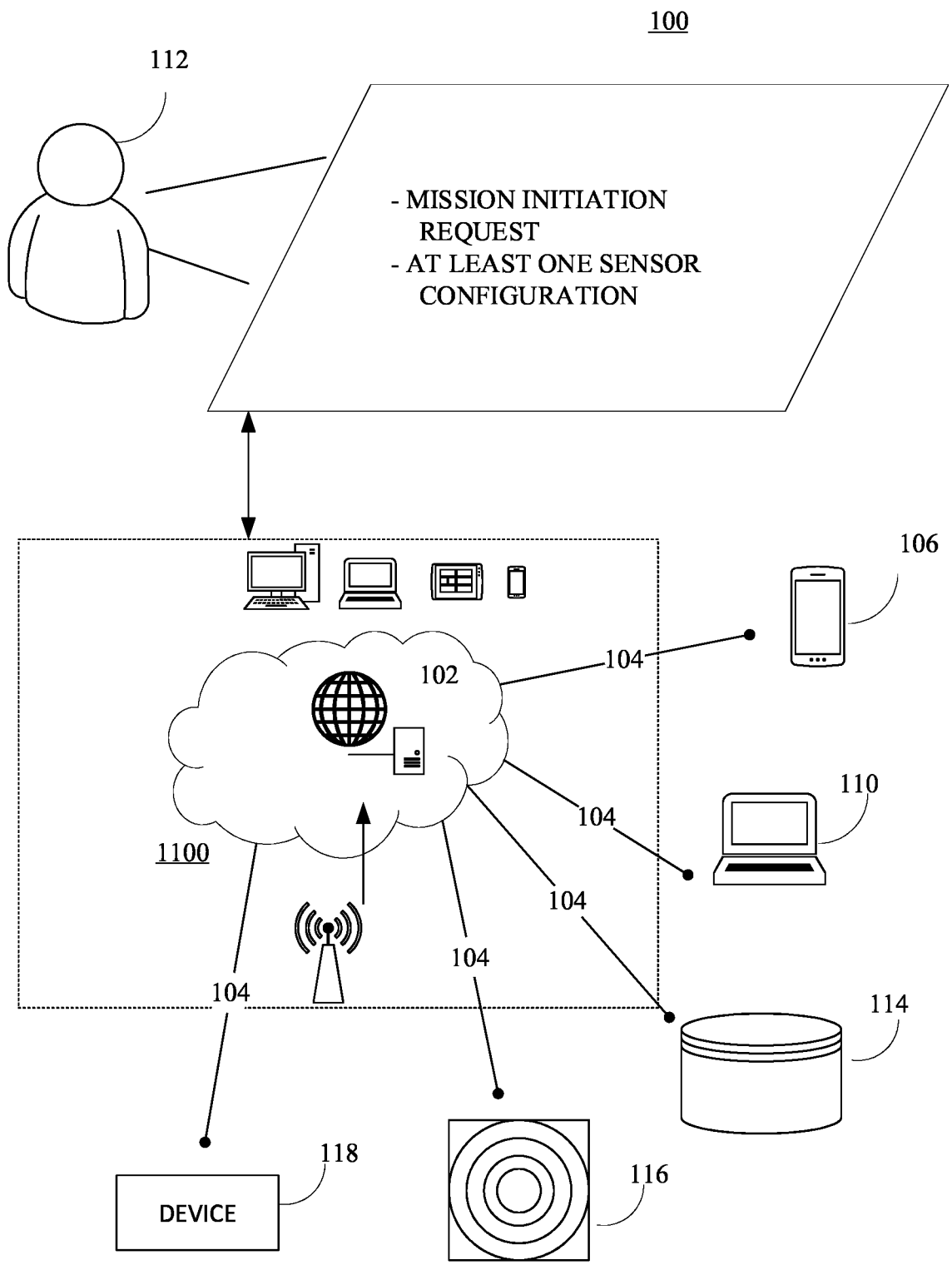
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating managing of paths for unmanned vehicles, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating managing of paths for unmanned vehicles. Further, the disclosed system may be configured for using multiple drones and sensors for path planning. Further, the disclosed device uses a plurality of drones and different types of sensors to obtain information about the surrounding area. Furthermore, the device uses unique techniques to achieve path planning.

Further, the disclosed system may provide fully functioning and optimized path planning for autonomous robots. Further, robots may include drones, ground sensors, aerial sensors, stationary robots, or of the likes may be used to achieve the objectives. The disclosed device may be associated with a hierarchical platform with a plurality of aerial, ground, and stationary robots/drones/sensors are tasked with different and conceptually discrete aspects of the information acquisition process as well as path planning in a complex environment. The disclosed device may be configured for information lateralization similarly to how the human brain. Further, the human brain has two hemispheres in which specializes in a different and specific task. The disclosed device may be communicatively coupled to robots, drones, and sensors that are tasked with complimentary functionalities acquiring information at a different resolution, scale, and subsequently different noise/reliability. Information is initially gathered by the aerial, ground, and stationary robots/drones/sensors for the surrounding area. Further, the information gathered by the robots, drones, and sensors is then aggregated at a gateway powered by appropriate machine learning models that may integrate the inherently heterogeneous, multi-resolution, and potentially multi-modal acquired information. The gateway comprises four architectures in which information is integrated; digital twin with uncertainty quantification, integration of the hierarchically structured observations, predicted state of the digital twin, and continual correction and learning via (an active) filter. After the information has been processed, the information is fed back into the robots, drones, and sensors to adjust the planned path for the mission at hand which is done in a two-step operation. The two-step operation comprises a macro-scale drone path planning with lateralized functionalities and dynamic path adjustments and contextual optimization.

Figure 6:
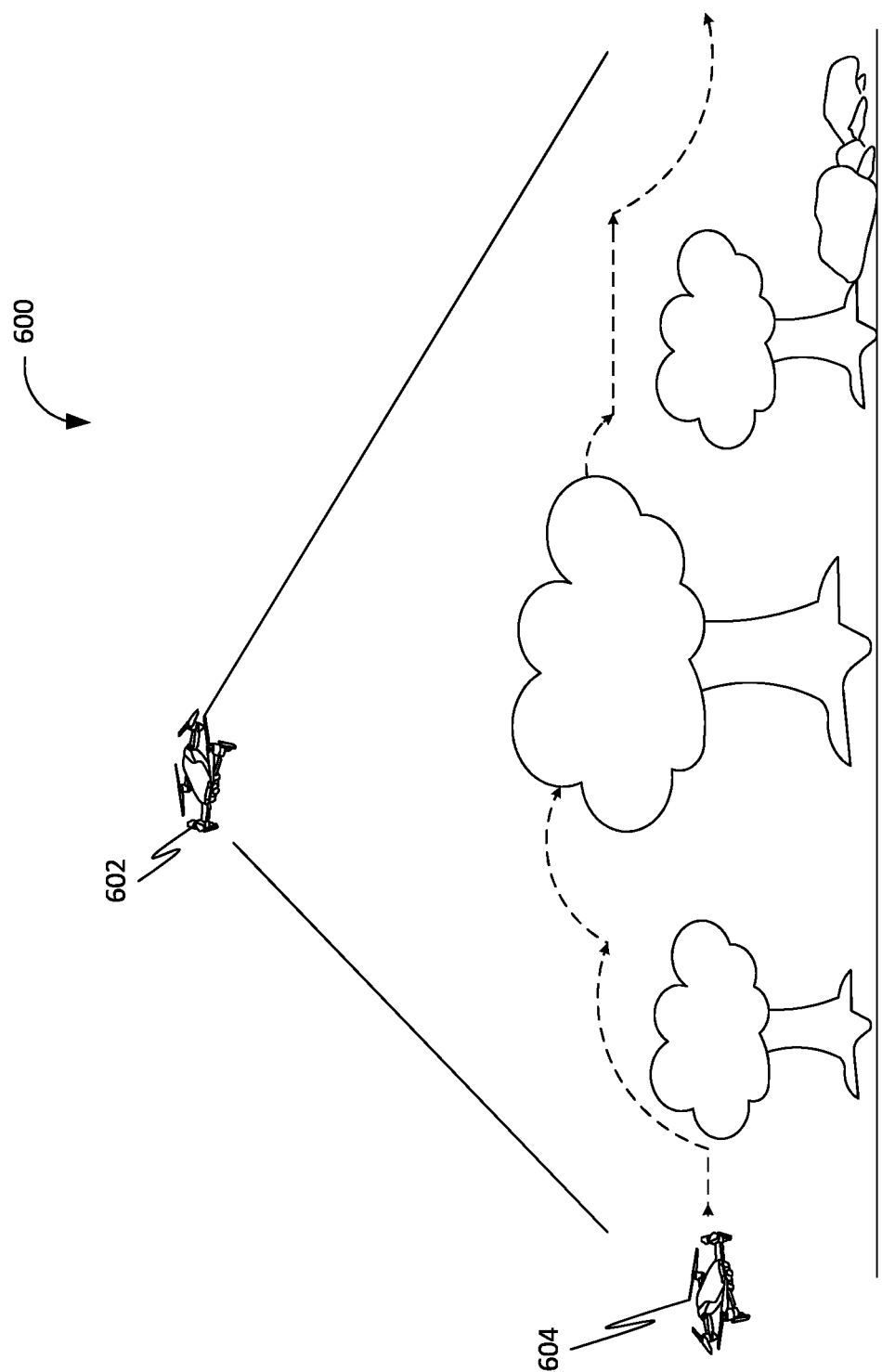
FIG. 6 is a schematic of a system for facilitating the managing of paths for unmanned vehicles, in accordance with some embodiments.

Further, the disclosed system may include a multi-drone/sensor platform with information lateralization and federated path planning. Further, the disclosed system may be associated with a hierarchical platform where multiple aerial, ground, and stationary robots, drones & sensors are tasked with the different and conceptually distinct aspects of the information acquisition process as well as path planning in a complex environment. Further, the disclosed system is closely modeled after the lateralization of brain functions in humans, i.e. the tendency for some neural functions or cognitive processes to be specialized to one of the two cerebral hemispheres. In particular, left cerebral hemisphere representations have been proposed to be more focal, whereas right-lateralized mechanisms are believed to be more high-level representing broader contexts. Similarly, at the onset of a mission, different drones and sensors are tasked with complimentary functionalities acquiring information at a different resolution, scale, and subsequently different noise/reliability. The information is then aggregated at the gateway powered by appropriate machine learning models that can integrate this inherently heterogeneous, multi-resolution, and potentially multi-modal acquired information/dataset. The information gathered is then fed back to adjust the planned path for the mission at hand.

Where in this setting the observations of each of the $k$ sensors are closed to most $$y_i(t)=f(\theta,X(t),S_i(t))+Z(S_i(t)) i=1,2,\ldots,k$$

if i is a drone (mobile): $S_i(t) \subset S_{i-1}(t)$, $S_i(t)$ is controlled via movement if i is not a drone (static): $S_i(t)=S_i(0)$ effectively and hierarchically. This means that the observations are given by:

where $y_i(t)$, $i=1, 2 \ldots, k$, are the observations from k sensors which themselves are functions of the environment, $\theta$, moving objects' location $X(t)$, and the sensors' field of view. Further, a first innovation of the disclosed system here capitalizes on the fact that the field of the view of k' of the sensors, those that are mounted on the drones, can be carefully controlled (via movement). Further, a second innovation here is that the lateralization of functionalities drones allows for a pre-defined nested hierarchy. Further, in an instance, a simple two drone setting is considered (as shown in FIG. 6), where a first drone, named SOTERIA, may be lateralized to acquire "context information" while a second drone, named SOTER, is lateralized to collect high-resolution local information. Context information SOTERIA is tasked to always include the localized information SOTER is tasked to collect; this is denoted by the nested hierarchy in the fields of the views of the drones, hence, the assertion that $S_2(t) \subset S_1(t)$. While there is a multiplicity of work on multi-drone cooperation and swarming, very little has been done in terms of hierarchical representation and acquisition of information on multi-drone platforms. Specifically, this is true when the type of devices/sensors being used for data acquisition are diverse, and in many cases, not necessarily drones at all. For example, some of the participating devices may be stationary sensors, others may be ground robots, while some may be aerial drones.

Further, the gateway is where the information is integrated via an architecture. Further, the gateway may be associated with a digital twin with uncertainty quantification. Further, the architecture builds upon a 3D representation/model of the environment. While at the start of a mission, the 3D digital twin is initialized to its static state, observations are accumulated throughout the mission to provide a temporally updated model. More specifically, at any time t, given the collective and integrated observations across the platform, areas of change and location of moving objects are identified. Furthermore, the uncertainty about the locations of change as well as moving objects will be quantified and tracked. Further, the architecture may be based on the integration of the hierarchically structured observations. The fusion of information gathered at arbitrary points in time and space is known to be computationally infeasible. Further, lateralization of the drones and robots provides a breakthrough step. Further, the state of the digital twin may be projected onto the space of observations. Secondly, the lateralization of drones and robots means that the observation spaces of the drones follow a pre-specified nested hierarchy. This allows a factorization of information vectors and a computationally feasible fusion algorithm. Further, the gateway may be associated with a predicted state of the digital twin. The past observations together with the prior state of the digital twin and the prior (immediate) uncertainty in the model are carefully integrated with the mobility pattern of the drones to predict the full state of the digital twin. By carefully integrating the data with the mobility and physic-cognizant models of the space, this forms the core of an extended active filter. Again this prediction comes with quantification of uncertainty. Further, the gateway may be associated with continual correction and learning via (an active) filter. The most recent observations collected and reported by the drones (onboard mobile sensors) as well as static sensors distributed in an environment are compared against the predicted state of the digital twin, or more precisely its projection onto observation space. Further, the observations are not only enabling the gateway intelligence to make its knowledge of the space more precise but also allow for further learning. More specifically, a residual model will be deployed.

The integrated information is then used to give a real-time command to the drones as they traverse space. This is done via a two-step operation. Further, a first step of the two-step operation may include macro-scale drone path planning with lateralized functionalities. Further, the disclosed lateralization of drones is enabled by a set of pre-defined mission-specific paths defined for the set of our k' drones. This, for example, in the two drone settings, may be carried out by assigning a higher elevation flight with fewer hovering spots to SOTERIA, i.e. the "context" drone, while SOTER is assigned a flight path of lower elevation with more frequent stops. When the mission's performance is defined in terms of (low) energy consumption or time, the disclosed system augments the classical shortest-path algorithm for SOTER with that of the accompanying path to ensure full coverage of the SOTER's path by SOTERIA. The path planning may rely on an efficient summary of the digital twin to identify the mean cost/reward associated with each hop of SOTER's path. Further, let $z^i(t)$ denotes the location of SOTER drone i at time t. Now the algorithm may rely on the mean reward associated with traversing from any two points, hence, $R[z^i(t) \rightarrow z^i(t+1)]$ subject to the constraint that both locations $\hat{z}^i(t)$ and $\hat{z}^i(t+1)$ are within the fields of view $S_{i'}(t)$, $S_{i'}(t+1)$ of the context drones i' at times t, t+1. Further, the gateway may be associated with dynamic path adjustments and contextual optimization: While the flight paths for drones with lateralized functionalities may be planned ahead of a mission at a macro-scale, the details of the paths must be adjusted to the specific contexts of the mission. Further, context-specific attributes that the paths need to be adjusted to include environmental attributes such as wind and/or lighting conditions as well as the appearance of obstacles, humans, etc. The disclosed system may be configured for lateralization of the functionalities and sensing domains and collective information acquisition setup allows the adjustments to the paths to be done more efficiently with provable gains over a single drone or swarm settings with uniform functionalities across various drones.

At any given time t during the mission, the location $z^{i'}(t)$ of the SOTERIA, i.e. context drone, i' determines its field of the view, $S_i(t)$, which subsumes the field of view of the corresponding drone i (SOTER) such that $S_i(t) \subset S_{ij}(t)$. The integrated information content of the fields of view of the sensors and drones then provides the context for the specifically reachable points in space for drone i (SOTER).

Figure 10:
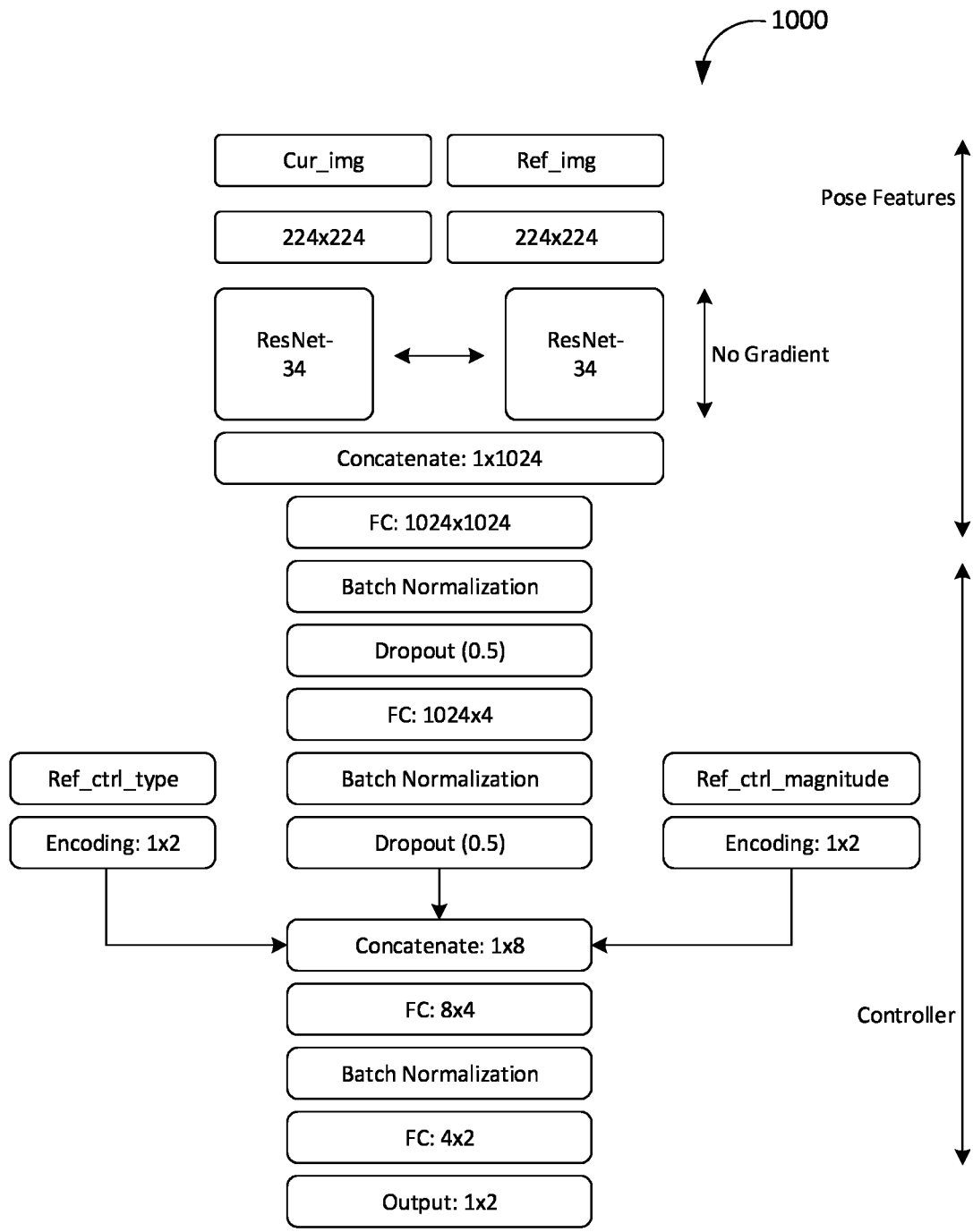
FIG. 10 is a schematic of a neural network architecture associated with the system for joint estimation and correction, in accordance with some embodiments.

Further, in an instance, a first drone/robot, called SOTER, and a second robot/drone SOTERIA, may interact with the environment and follows a reference trajectory P generated by an expert issuing an action sequence over discrete time step. Further, the SOTER drone's information needs to be combined with the observation from other camera/drones' observations. Due to environmental disturbance or fluctuation in drone's dynamics, it would deviate from the reference path $\overline{X}_t \in := \{\overline{X}_1, \overline{X}_2, \ldots\}$ set by the open-loop actions $g_t \in G := \{g_1, g_2, \ldots\}$. Further, the device may include a feedback controller that corrects the deviation from the reference trajectory without explicitly knowing the drone's position and the map. At each time step t, SOTERIA and SOTER drones/cameras' outputs are combined to estimate and correct SOTER's position. The edge gateway/controller receives a set of observations $o_t$, corrects the location of the SOTER relative to a reference position $\overline{X}_t$, takes a move action to end at next position $X_{t+1}$. Further, the disclosed system may be based on a reinforcement-learning-based imitation learning method for correcting the trajectory of the drone. The network architecture includes two parts, as shown in FIG. 10. The first part aims for extracting the relative pose information from the image pair and the second part aims to predict the control correction.

Further, training data for the controller performs an important role in imitation learning. Simply collecting an expert's demonstrations is known to lead to an unreliable model. Small failures at the beginning during testing may cause the system into states that are outside the distribution in the training data, resulting in compounding errors. To avoid this problem, training data may include observations that the drone recovers from minor drifts. In other words, higher accuracy is achieved by the expert in the loop during collecting the training data. It takes the idea from online learning and iteratively augments the re-labeled actions by an expert to the training set while testing the model. In particular, the observation is recorded from multiple cameras simultaneously, with one camera strictly including the field of the view of the SOTER. These neighboring views with adjusted labeled actions are added to the training data aiming at simulating the drifts correction.

Figure 9:
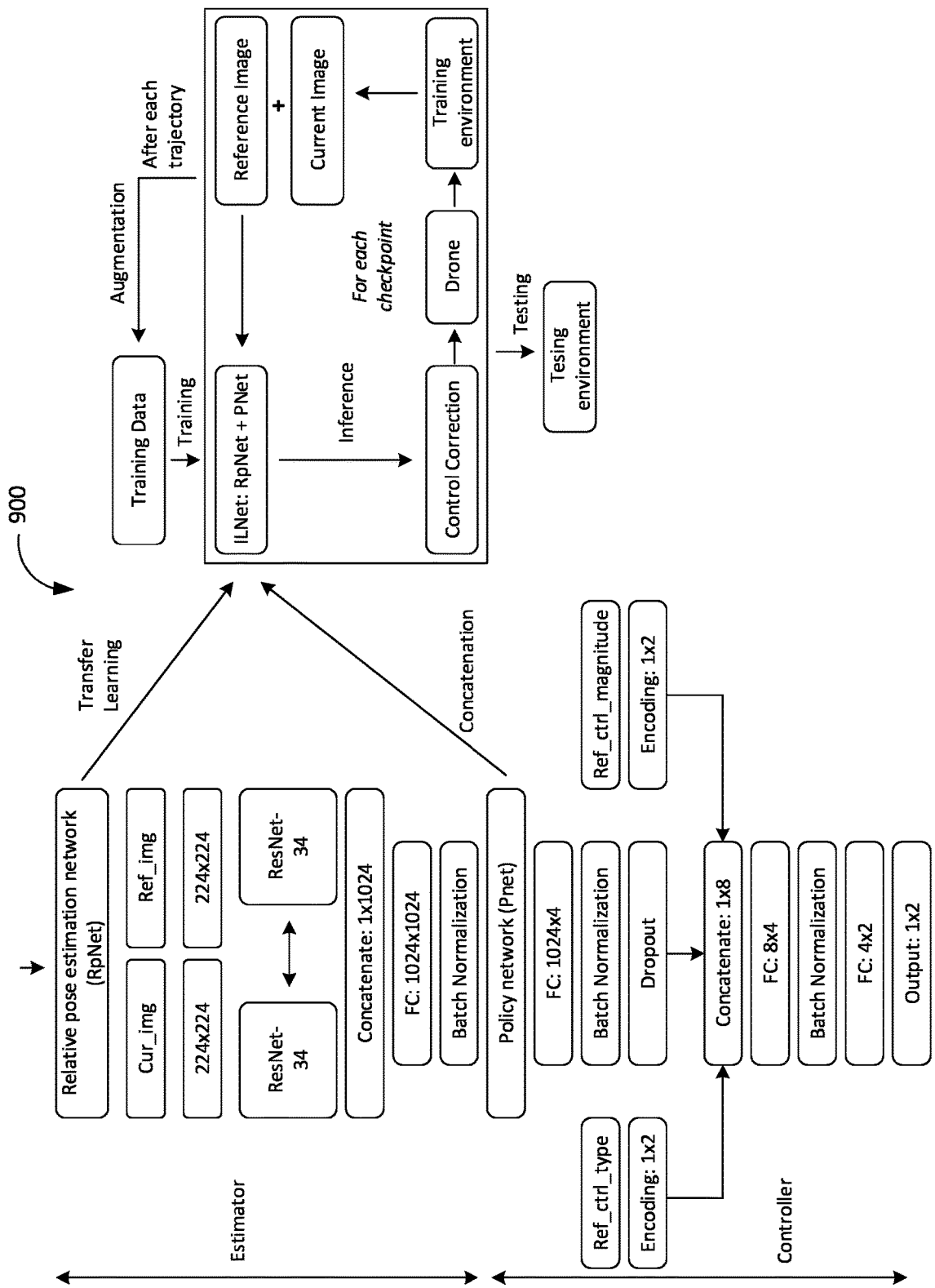
FIG. 9 is a schematic of a neural network pipeline associated with the system for learning with data augmentation, in accordance with some embodiments.

Further, the disclosed device may adopt and modify data augmentation techniques using a data augmentation pipeline that may be as follows: executes the predicted action, re-label the observation where drifts or errors happen, add the new data to the training set and repeat the procedure. Further, the training dataset may be augmented by not only exploring several reference trajectories but also injecting i.i.d. Gaussian noise into a reference control sequence $g_t$. Further, a final data collection pipeline may be as shown in FIG. 9. The dataset may be split into training image pairs and testing image pairs sets.

FIG. 1 is an illustration of an online platform 100 consistent with various embodiments of the present disclosure. By way of non-limiting example, the online platform 100 for facilitating managing of paths for unmanned vehicles may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, and a device 118 (such as a device 200) over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1100.

Figure 2:
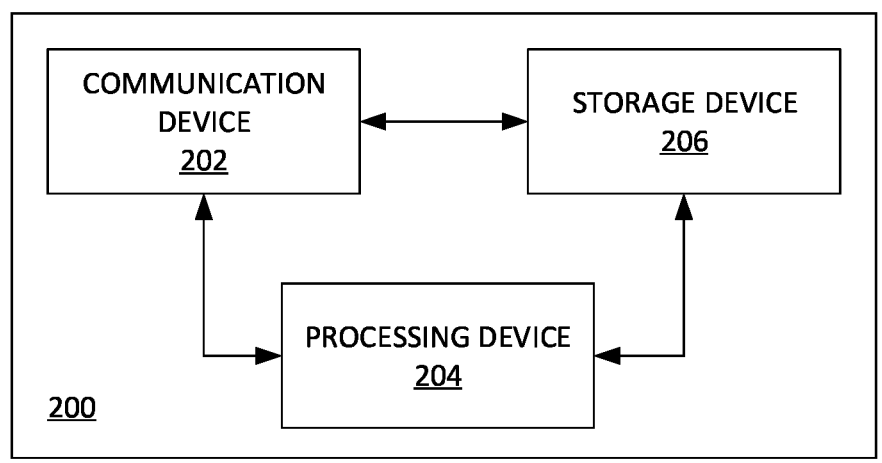
FIG. 2 is a block diagram of a device for facilitating managing of paths for unmanned vehicles, in accordance with some embodiments.

FIG. 2 is a block diagram of a device 200 for facilitating managing of paths for unmanned vehicles, in accordance with some embodiments. Accordingly, the device 200 may be configured to be communicatively coupled with the unmanned vehicles. Further, the unmanned vehicles may include drones. Further, the device 200 may include a communication device 202 configured for receiving a plurality of heterogeneous information from a plurality of sensors associated with a plurality of unmanned vehicles. Further, the plurality of sensors may be configured for generating the plurality of heterogeneous information of an environment from a plurality of field of views of the plurality of sensors. Further, a heterogeneity of the plurality of heterogeneous information may be based on the plurality of field of views. Further, the plurality of field of views may be hierarchically nested based on a hierarchical order of the plurality of unmanned vehicles. Further, the plurality of heterogeneous information may be hierarchically nested based on hierarchical nesting of the plurality of field of views. Further, the communication device 202 may be configured for transmitting a plurality of commands to the plurality of unmanned vehicles. Further, the plurality of unmanned vehicles may be configured for traversing the environment based on the plurality of commands. Further, the plurality of unmanned vehicles may be configured for performing at least one mission based on the traversing.

Further, the device 200 may include a processing device 204 communicatively coupled with the communication device 202. Further, the processing device 204 may be configured for integrating the plurality of heterogeneous information. Further, the processing device 204 may be configured for generating integrated information of the environment based on the integrating. Further, the processing device 204 may be configured for analyzing the integrated information based on a plurality of paths assigned to the plurality of unmanned vehicles for performing the at least one mission. Further, the processing device 204 may be configured for determining an adjustment required to be made in the plurality of paths by the plurality of unmanned vehicles based on the analyzing. Further, the processing device 204 may be configured for generating the plurality of commands for the plurality of unmanned vehicles based on the determining of the adjustment.

Further, the device 200 may include a storage device 206 communicatively coupled with the processing device 204. Further, the storage device 206 may be configured for storing the plurality of paths assigned to the plurality of unmanned vehicles for performing the at least one mission.

Further, in some embodiments, a primary field of view of a primary sensor associated with a primary unmanned vehicle of a higher hierarchical order includes a secondary field of view of a secondary sensor associated with a secondary unmanned vehicle of a lower hierarchical order. Further, the primary sensor may be configured for generating primary information of the plurality of heterogeneous information associated with the environment from the primary field of view and the secondary sensor may be configured for generating secondary information of the plurality of heterogeneous information associated with the environment from the secondary field of view. Further, the primary information includes the secondary information based on the hierarchical nesting of the plurality of field of views.

Further, in some embodiments, the integrating of the plurality of heterogeneous information may include integrating the plurality of heterogeneous information using at least one machine learning model. Further, the at least one machine learning model may be trained to integrate heterogeneous information. Further, the generating of the integrated information may be based on the integrating of the plurality of heterogeneous information using the at least one machine learning model.

Further, in some embodiments, the plurality of sensors may be configured for detecting a value of at least one environmental condition of the environment from the plurality of field of views based on the traversing of the environment by the plurality of unmanned vehicles. Further, the generating of the plurality of heterogeneous information may be based on the detecting.

Further, in some embodiments, the plurality of sensors may be configured for detecting an appearance of at least one object in the environment from the plurality of field of views based on the traversing of the environment by the plurality of unmanned vehicles. Further, the generating of the plurality of heterogeneous information may be based on the detecting.

Further, in some embodiments, the generating of the plurality of heterogeneous information may include generating the plurality of heterogeneous information with a plurality of information characteristics. Further, the heterogeneity of the plurality of heterogeneous information may be based on a dissimilarity between the plurality of information characteristics of the plurality of heterogeneous information.

Further, in some embodiments, the storage device 206 may be configured for storing the plurality of heterogeneous information and the integrated information in a distributed ledger.

Further, in some embodiments, the communication device 202 may be configured for receiving a mission initiation request for initiating the performing of the at least one mission from at least one user device. Further, the storage device 206 may be configured for retrieving the plurality of paths associated with the plurality of unmanned vehicles. Further, the determining of the adjustment in the plurality of paths of the plurality of unmanned vehicles may be based on the retrieving.

Further, in some embodiments, the processing device 204 may be configured for analyzing the plurality of paths based on the retrieving. Further, the processing device 204 may be configured for lateralizing the plurality of unmanned vehicles based on the analyzing the plurality of paths. Further, the processing device 204 may be configured for determining the hierarchical order based on the lateralizing of the plurality of unmanned vehicles. Further, the hierarchical nesting of the plurality of field of views may be based on the determining of the hierarchical order.

Further, in some embodiments, the communication device 202 may be configured for receiving at least one sensor configuration associated with at least one sensor of the plurality of sensors from at least one user device. Further, the processing device 204 may be configured for analyzing the at least one sensor configuration. Further, the processing device 204 may be configured for determining a modification in at least one field of view of the at least one sensor based on the analyzing of the at least one sensor configuration. Further, the processing device 204 may be configured for generating a field of view modification command for the at least one sensor based on the determining of the modification. Further, the at least one sensor may be configured for modifying the at least one field of view based one the field of view modification command.

Further, in some embodiments, the plurality of sensors may be configured for performing a plurality of functions. Further, the generating of the plurality of heterogeneous information may be based on the performing of the plurality of functions. Further, the heterogeneity of the plurality of heterogeneous information may be based on a dissimilarity between the plurality of functions. Further, the processing device 204 may be configured for lateralizing the plurality of functions to the plurality of unmanned vehicles based on the hierarchical order of the plurality of unmanned vehicles. Further, the plurality of heterogeneous information may be hierarchically nested based on the lateralizing.

Further, in some embodiments, the plurality of sensors may include at least one moving sensor and at least one stationary sensor. Further, the at least one moving sensor may be mounted on at least one unmanned vehicle of the plurality of unmanned vehicles. Further, the at least one moving sensor traverses the environment based on the traversing of the at least one unmanned vehicle of the plurality of unmanned vehicles. Further, the at least one stationary sensor may be stationarily placed in the environment.

Further, in some embodiments, the plurality of field of views of the plurality of sensors covers a plurality of portions of the environment. Further, the generating of the plurality of heterogeneous information may include generating the plurality of heterogeneous information of the plurality of portions of the environment. Further, the heterogeneity of the plurality of heterogeneous information may be based on a dissimilarity between the plurality of portions of the environment.

Figure 3:
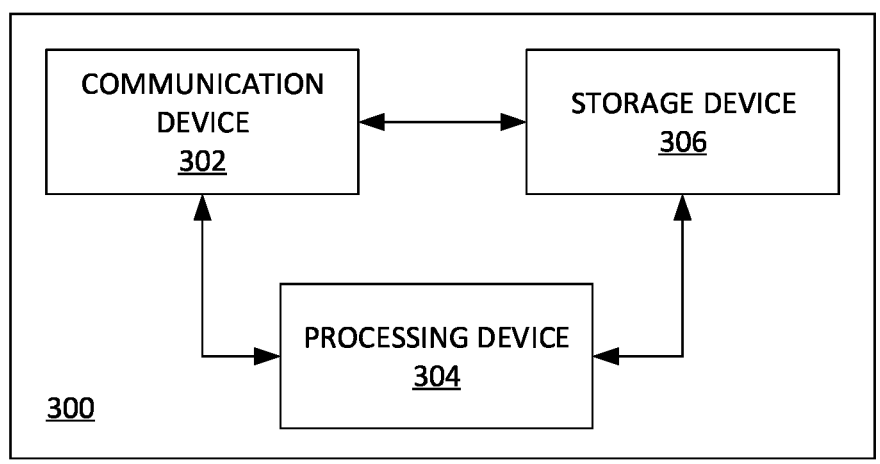
FIG. 3 is a block diagram of a device for facilitating managing of paths for unmanned vehicles, in accordance with some embodiments.

FIG. 3 is a block diagram of a device 300 for facilitating managing of paths for unmanned vehicles, in accordance with some embodiments. Accordingly, the device 300 may be configured to be communicatively coupled with the unmanned vehicles. Further, the device 300 may include a communication device 302 configured for receiving a plurality of heterogeneous information from a plurality of sensors associated with a plurality of unmanned vehicles. Further, the plurality of sensors may be configured for generating the plurality of heterogeneous information of an environment from a plurality of field of views of the plurality of sensors. Further, a heterogeneity of the plurality of heterogeneous information may be based on the plurality of field of views. Further, the plurality of field of views may be hierarchically nested based on a hierarchical order of the plurality of unmanned vehicles. Further, the plurality of heterogeneous information may be hierarchically nested based on hierarchical nesting of the plurality of field of views. Further, a primary field of view of a primary sensor associated with a primary unmanned vehicle of a higher hierarchical order includes a secondary field of view of a secondary sensor associated with a secondary unmanned vehicle of a lower hierarchical order. Further, the primary sensor may be configured for generating primary information of the plurality of heterogeneous information associated with the environment from the primary field of view and the secondary sensor may be configured for generating secondary information of the plurality of heterogeneous information associated with the environment from the secondary field of view. Further, the primary information includes the secondary information based on the hierarchical nesting of the plurality of field of views. Further, the communication device 302 may be configured for transmitting a plurality of commands to the plurality of unmanned vehicles. Further, the plurality of unmanned vehicles may be configured for traversing the environment based on the plurality of commands. Further, the plurality of unmanned vehicles may be configured for performing at least one mission based on the traversing.

Further, the device 300 may include a processing device 304 communicatively coupled with the communication device 302. Further, the processing device 304 may be configured for integrating the plurality of heterogeneous information. Further, the processing device 304 may be configured for generating integrated information of the environment based on the integrating. Further, the processing device 304 may be configured for analyzing the integrated information based on a plurality of paths assigned to the plurality of unmanned vehicles for performing the at least one mission. Further, the processing device 304 may be configured for determining an adjustment required to be made in the plurality of paths by the plurality of unmanned vehicles based on the analyzing. Further, the processing device 304 may be configured for generating the plurality of commands for the plurality of unmanned vehicles based on the determining of the adjustment.

Further, the device 300 may include a storage device 306 communicatively coupled with the processing device 304. Further, the storage device 306 may be configured for storing the plurality of paths assigned to the plurality of unmanned vehicles for performing the at least one mission.

Further, in some embodiments, the integrating of the plurality of heterogeneous information may include integrating the plurality of heterogeneous information using at least one machine learning model. Further, the at least one machine learning model may be trained to integrate heterogeneous information. Further, the generating of the integrated information may be based on the integrating of the plurality of heterogeneous information using the at least one machine learning model.

Further, in some embodiments, the plurality of sensors may be configured for detecting a value of at least one environmental condition of the environment from the plurality of field of views based on the traversing of the environment by the plurality of unmanned vehicles. Further, the generating of the plurality of heterogeneous information may be based on the detecting.

Further, in some embodiments, the plurality of sensors may be configured for detecting an appearance of at least one object in the environment from the plurality of field of views based on the traversing of the environment by the plurality of unmanned vehicles. Further, the generating of the plurality of heterogeneous information may be based on the detecting.

Further, in some embodiments, the generating of the plurality of heterogeneous information may include generating the plurality of heterogeneous information with a plurality of information characteristics. Further, the heterogeneity of the plurality of heterogeneous information may be based on a dissimilarity between the plurality of information characteristics of the plurality of heterogeneous information.

Further, in some embodiments, the plurality of sensors may be configured for performing a plurality of functions. Further, the generating of the plurality of heterogeneous information may be based on the performing of the plurality of functions. Further, the heterogeneity of the plurality of heterogeneous information may be based on a dissimilarity between the plurality of functions. Further, the processing device 304 may be configured for lateralizing the plurality of functions to the plurality of unmanned vehicles based on the hierarchical order of the plurality of unmanned vehicles. Further, the plurality of heterogeneous information may be hierarchically nested based on the lateralizing.

Further, in some embodiments, the plurality of sensors may include at least one moving sensor and at least one stationary sensor. Further, the at least one moving sensor may be mounted on at least one unmanned vehicle of the plurality of unmanned vehicles. Further, the at least one moving sensor traverses the environment based on the traversing of the at least one unmanned vehicle of the plurality of unmanned vehicles. Further, the at least one stationary sensor may be stationarily placed in the environment.

Figure 4:
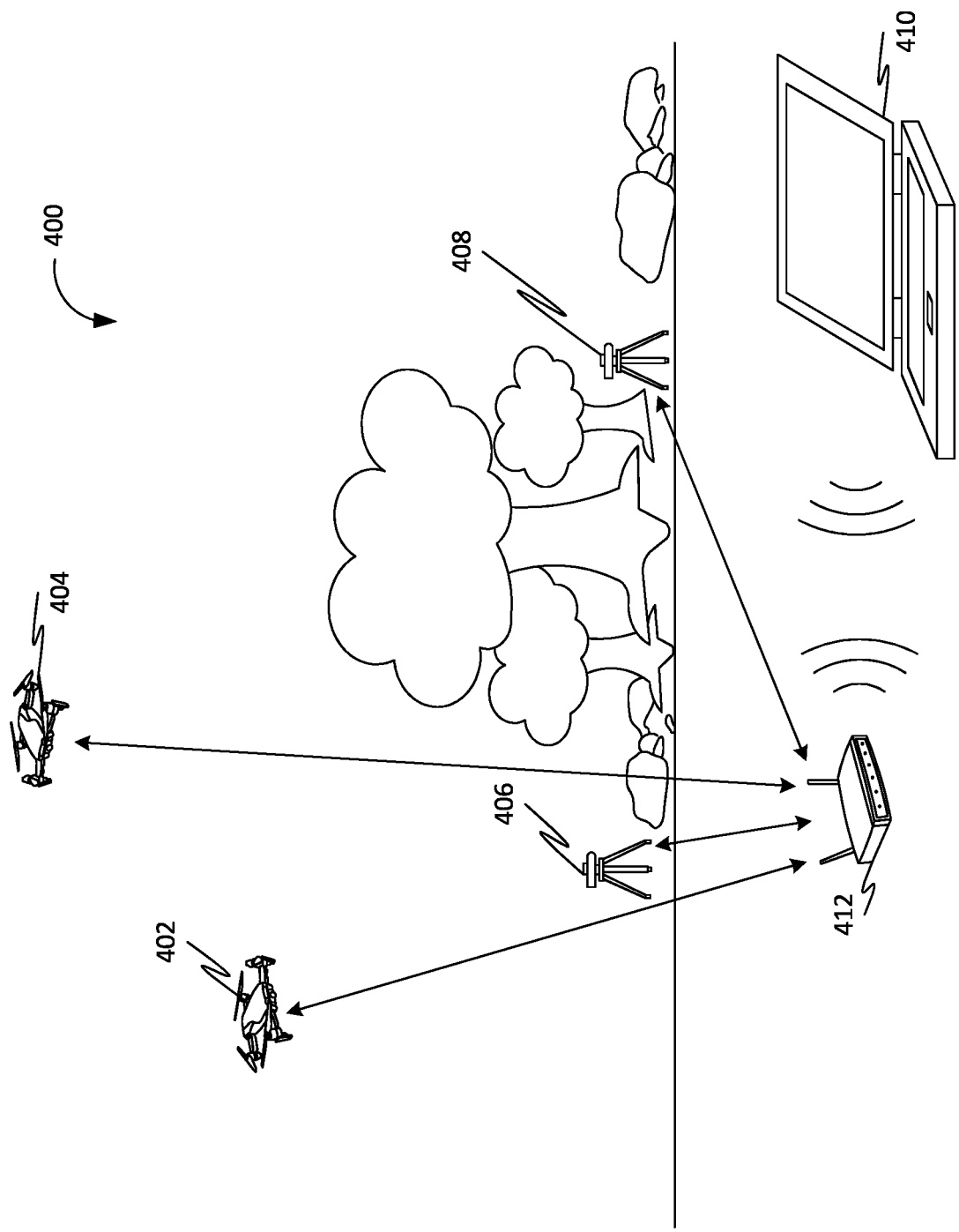
FIG. 4 is a schematic of a system for facilitating the managing of paths for unmanned vehicles, in accordance with some embodiments.

FIG. 4 is a schematic of a system 400 for facilitating the managing of paths for unmanned vehicles, in accordance with some embodiments. Accordingly, the system 400 may include a plurality of drones 402-404, a sensor 406, and a robot 408 communicatively coupled to a user device 410 (such as a laptop) using a wired/wireless communication device 412. Further, the plurality of drones 402-404, the sensor 406, and the robot 408 are shown in unison with a gateway that information is integrated through multiple architectures then used to give a real-time command to the robots, sensors, and drones as they traverse the surrounding area.

Further, the system 400 may be configured for providing observation of each of the k' sensors that are closed to most effectively and hierarchically. This means that the observations are given by the following: $y_i(t) = f(\emptyset, X(t), S_i(t)) + Z(S_i(t))$ $i = 1, 2, 3 \ldots, k$ If i is a drone/mobile: $S_i(t) \subset S_{i-1}(t)$, $S_i(t)$ is controlled via movement If i is stationary: $S_i(t) = S_i(0)$ $y_i(t)$, $i = 1, 2, 3 \ldots, k$, are the observations from k sensors which themselves are functions of the environment ($\emptyset$), moving objects' location ($X(t)$), and the sensors' field of view $S_i(t)$. The innovation capitalizes on the field of view of k' of the sensors, sensors that are mounted on the drones, can be remotely controlled through movement. The second innovation of the present invention is that the lateralization of functionalities, the drones allow for a pre-defined nested hierarchy. For example, this can be illustrated with two drones 602-604, as shown in FIG. 6. Further, a first drone 602 may be named SOTERIA and a second drone 604 is named SOTER. SOTERIA is lateralized to acquire "context" information while SOTER is lateralized to collect "high-resolution local" information. Context information SOTERIA is tasked to collect information and always include the localized information of SOTER. While SOTER is tasked to collect information without the inclusion of SOTERIA. This is designated by the nested hierarchy in the fields of the views of the drones, hence, the assertion that $S_2(t) \subset S_1(t)$. While there is a multiplicity of work on multi-drone cooperation and swarming, very little has been done in terms of hierarchical representation and acquisition of information multi-drone platforms. Specifically, this is true when the type of devices or sensors being used for data acquisition are diverse, and in many cases, not necessarily drones at all. For example, some of the participating devices may be stationary ground sensors, others may be ground robots, while some could be aerial drones.

Figure 5:
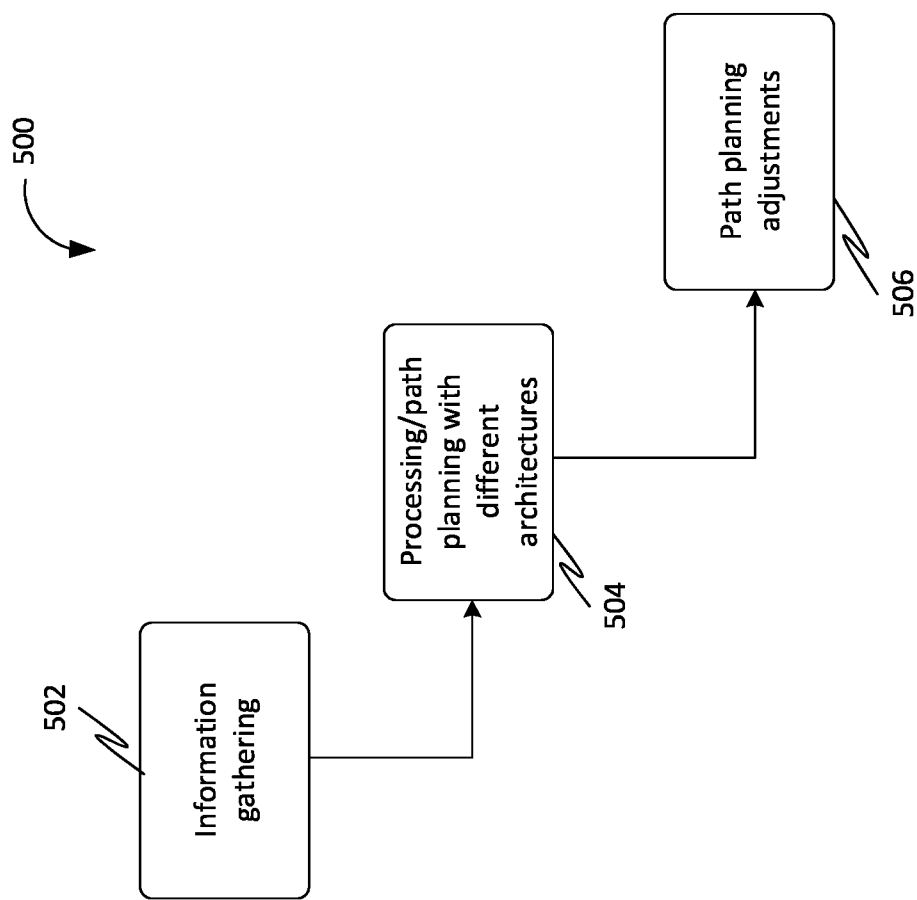
FIG. 5 is a flow diagram of a method for facilitating the managing of paths for unmanned vehicles, in accordance with some embodiments.

Further, digital twin with uncertainty quantification may be associated with a first architecture of the four architectures used for the gateway where the information gathered is processed, as shown in FIG. 5. The disclosed device builds upon a 3D representation/model of the environment. At the initial start of a mission for path planning, the 3D digital twin may be initialized to a static state, observations may be accumulated throughout the mission to provide a temporally updated model. More specifically, at any time t, given the collective and integrated observations across the platform, area of changes, and location of moving objects are identified. Additionally, the uncertainty about the locations of change as well as moving objects will be quantified and tracked.

Further, integration of the hierarchically structured observation may be be associated with a second architecture of the four architectures used for the gateway associated with the disclosed device where the information gathered is processed, as shown in FIG. 5. Integration of the hierarchically structured observation solves the challenging issue that information gathered at arbitrary points in time and space being computationally unfeasible to keep track of. The present invention comprises robots, drones, and sensors that are lateralized which are designed to specialize in specific information gathering and tasks. Note that the state of digital twin can be projected onto the space of observations and the lateralization of robots, drones, and sensors means that the observation spaces of the drones follow a pre-specified nested hierarchy. This allows a factorization of information vectors and a computationally feasible fusion algorithm.

Further, the predicted state of a digital twin may be associated with a third architecture used in the path planning of the disclosed device, as shown in FIG. 5. Further, the third architecture assists in the prediction of path planning as the environment that is being observed changes. The past observation together with the prior state of the digital twin and the immediate uncertainty in the model is carefully integrated with the mobility pattern of the drones to predict the full state of the digital twin. The disclosed device processes and integrate the gathered information and data by the robots, drones, and sensors into physic-cognizant models of the space, which forms the core of an extended active filter. The predicted state of the digital twin comes along with a quantification of uncertainty.

Further, continual correction and learning through an active filter maybe a fourth architecture of the four architectures used in the processing/path planning of the disclosed device, as shown in FIG. 5. The continual correction and learning through an active filter uses the most recent observation and information collected and reported by the robots, drones, and sensors distributed in an environment is compared against the predicted state of the digital twin, or more specifically its projection onto observation space.

FIG. 5 is a flow diagram of a method 500 for facilitating the managing of paths for unmanned vehicles, in accordance with some embodiments. Accordingly, at 502, the method 500 may include information gathering using a plurality of aerial, ground, and stationary robots/drones/sensors around a surrounding area. Further, at 504, the method 500 may include processing/path planning with the four architectures. Further, the four architectures may include the digital twin with uncertainty quantification, the integration of the hierarchically structured observations, the predicted state of the digital twin, and the continual correction and learning via a (an active) filter Further, at 506, the method 500 may include path planning adjustments. Further, the path planning adjustments may include the macro-scale drone path planning with lateralized functionalities and the dynamic path adjustment and contextual optimization.

FIG. 6 is a schematic of a system 600 for facilitating the managing of paths for unmanned vehicles, in accordance with some embodiments. Accordingly, the system 600 may include the first drone 602 and the second drone 604.

Figure 7:
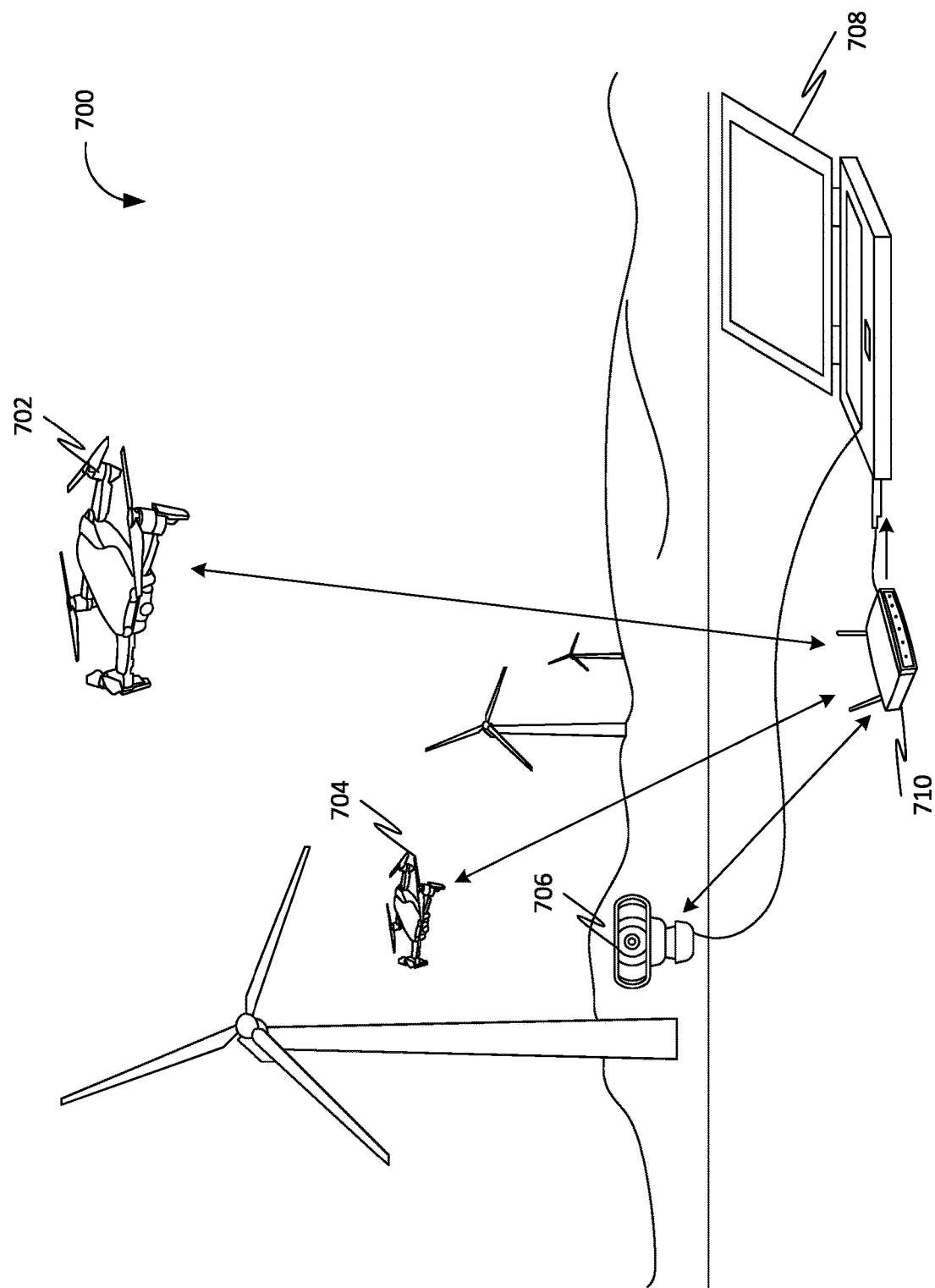
FIG. 7 is a schematic of a system for facilitating the managing of paths for unmanned vehicles, in accordance with some embodiments.

FIG. 7 is a schematic of a system 700 for facilitating the managing of paths for unmanned vehicles, in accordance with some embodiments. Accordingly, the system 700 may include a plurality of drones 702-704, an image sensor (or camera) 706 communicatively coupled to a user device (such as a laptop) 708 using a wired/wireless device 710.

Figure 8:
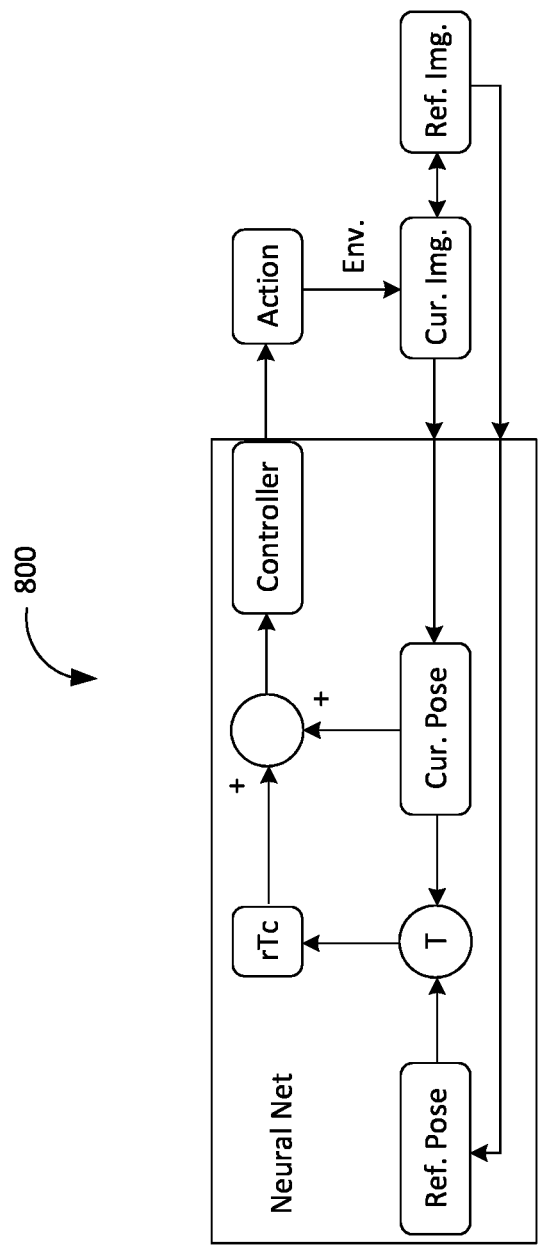
FIG. 8 is a schematic of a system architecture associated with the system, in accordance with some embodiments.

FIG. 8 is a schematic of a system architecture 800 associated with the system 400, in accordance with some embodiments. Accordingly, a reference image may be produced by the third architecture as the prediction of the full state of the digital twin. The observations are not only enabling the gateway intelligence more knowledgeable of the space more accurate but also allow for further learning. Further, a residual model may be deployed for further use.

After the processing/path planning with different architecture, the path planning adjustments are next as the integrated information is used to give a real-time command to the drones as they traverse the surrounding space. The path planning adjustments are done in a two-step operation, macro-scale drone path planning with lateralized functionalities, and dynamic path adjustments and contextual optimization.

Macro-scale drone path planning with lateralized functionalities is one of two steps in the path planning adjustment phase of the present invention as shown in FIGS. 5 and 6. The lateralization of drones is enabled by a set of pre-defined mission-specific paths defined for the set of k' drones. In the example of the two drones setting SOTERIA and SOTER as said before, macro-scale drone path planning with lateralized functionalities can be carried out by assigning a higher elevation flight with fewer hovering spots to SOTERIA, the "context" drone, while SOTER is assigned a flight path of lower elevation with more frequent stops as shown in FIG. 6. The macro-scale drone path planning with lateralized functionalities optimizes the use of time and energy as the algorithm augments the classical shortest path for SOTER with that of the accompanying path to ensure full coverage of the SOTER's path by SOTERIA. The path planning may rely on an efficient summary of the digital twin to identify the mean cost/reward associated with each hop of SOTER's path. Let $z^i(t)$ denote the location of SOTER drone i at time t. Further, an algorithm may rely on the mean reward associated with traversing from any two points, hence, $R[z^i(t) \rightarrow z^i(t+1)]$ subject to the constraint that both locations $z^i(t)$ and $z^i(t+1)$ are within fields of view $S_{i'}(t)$, $S_{i'}(t+1)$ of the context drones i' at times t, t+1.

Dynamic path adjustments and contextual optimization is the second step in the path planning adjustment phase of the present invention as shown in FIG. 5. Further, while the flight paths for drones with lateralized functionalities can be planned ahead of a mission at a macro-scale, the details of the paths must be adjusted to the specific contexts of the missions. The context-specific attributes that the paths need to be adjusted to include environmental attributes such as wind and/or storm conditions as well as the appearance of obstacles, humans, etc. Further, the optimization of the fields of view for mobile entities including drones may be considered. Furthermore, the optimal local trajectory given a particular context may be considered. This can be viewed as follows: Let $X_n$ denote current state at timestep n. The agent then takes context acquisition action $a_n$ which determines the field of the view of mobile units and reveals a context $Y_n$. Specifically, given location x and context acquisition action a, the observed context X is drawn from a probability distribution and the agent then incurs a context acquisition cost. After the agent observes context $Y_n$ at state $X_n$ and then it takes action $U_n$ and transitions to the next location $X_{(n+1)} \in N_{Y_n}$ where $N_Y$ denotes reachable location under context Y, i.e. the context puts a constraint on which locations the drone can transition to while incurring transition cost c(X_n, U_n). The reward R is collected if the agent reaches the destination safely.

The goal of Contextual Shortest Path (CSP) is to find a sequence of actions $a_n$ and $X_n$ for n=0, 1, 2, . . . , T, such that the total expected reward $J_T$ is maximized:

$$J_T = \mathbb{E}\left[r_T - \sum_{n=0}^{T} c_t(X_n, Y_n, u_n) + c_a(a_n)\right]$$

Further, the expectation is taken over context realizations, context acquisition actions, and state transition actions; also here $r_T$ is a random variable equal to delivery reward if the drone reaches its target before time horizon T and is equal to zero, otherwise. Since reward $J_T$ denotes the optimal expected reward under perfect knowledge of the model, then maximizing total expected reward is equivalent to minimize the regret. The lateralization functionalities and sensing domains and collective information acquisition setup associated with the device allow the adjustments to the paths to be done more efficiently with provable gains over a single drone or swarm settings with uniform functionalities across various robots, drones, and sensors. At any given time t during the path planning mission, the location $z^{i'}(t)$ of SOTERIA, the "context" drone, i' determines its field of view, St,(t), which subsumes the field of view of the corresponding SOTER drone i such that $S_i(t) \subset S_{i'}(t)$. The integrated information content of the fields of view of the sensors and drones then provides the context for the specifically reachable points in space for SOTER drone i.

FIG. 9 is a schematic of a neural network pipeline 900 associated with the system 400 for learning with data augmentation, in accordance with some embodiments.

FIG. 10 is a schematic of a neural network architecture 1000 associated with the system 400 for joint estimation and correction, in accordance with some embodiments.

Figure 11:
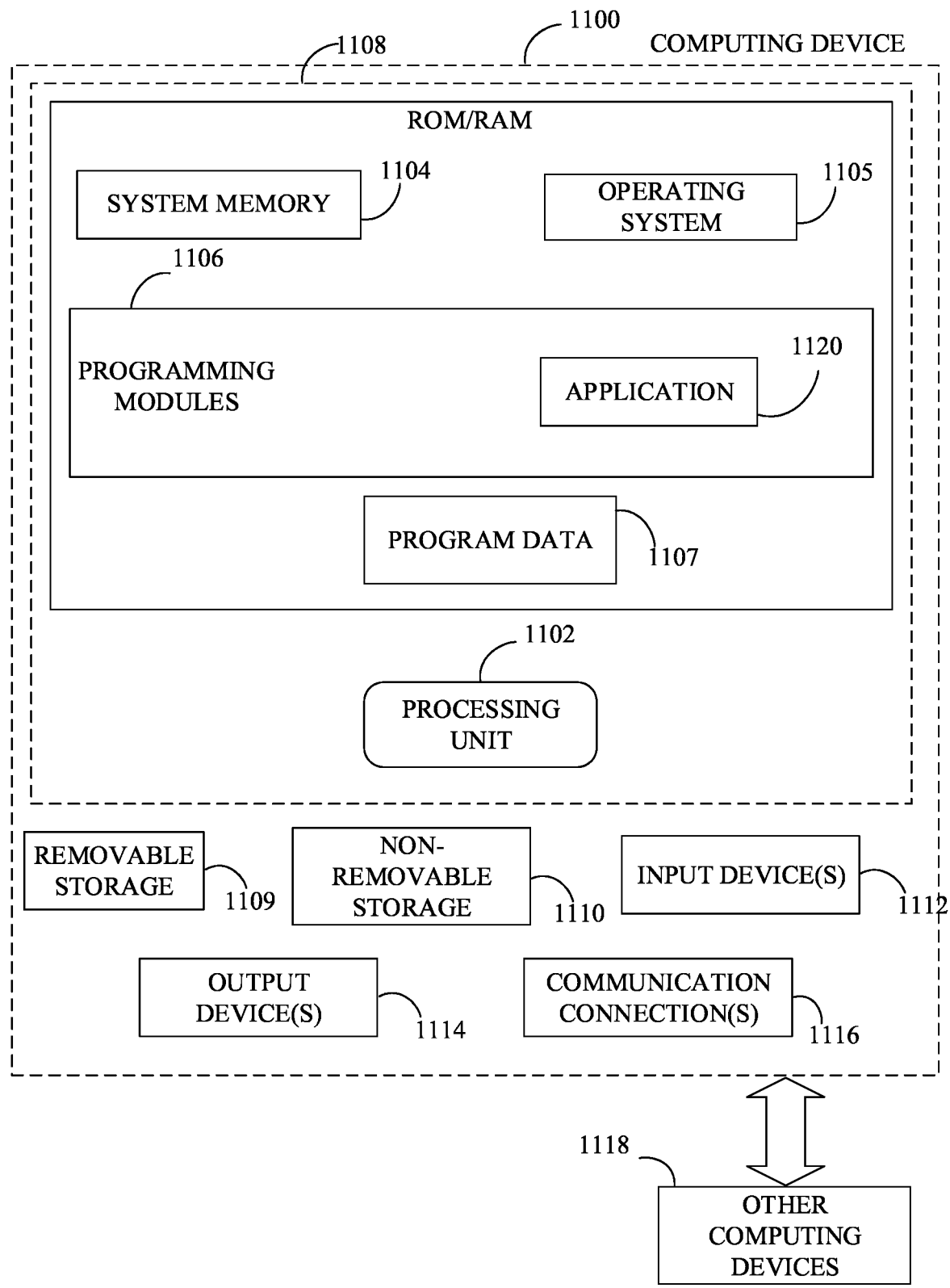
FIG. 11 is a block diagram of a computing device for implementing the methods disclosed herein, in accordance with some embodiments.

With reference to FIG. 11, a system consistent with an embodiment of the disclosure may include a computing device or cloud service, such as computing device 1100. In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination. System memory 1104 may include operating system 1105, one or more programming modules 1106, and may include a program data 1107. Operating system 1105, for example, may be suitable for controlling computing device 1100's operation. In one embodiment, programming modules 1106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 11 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and non-volatile, removable and non-removable media implemented in any method or technology for storage of information, such as computer-readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, a location sensor, a camera, a biometric sensor, etc. Output device(s) 1114 such as a display, speakers, a printer, etc. may also be included. The aforementioned devices are examples and others may be used.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1104, including operating system 1105. While executing on processing unit 1102, programming modules 1106 (e.g., application 1120) may perform processes including, for example, one or more stages of methods, algorithms, systems, applications, servers, databases as described above. The aforementioned process is an example, and processing unit 1102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A device for facilitating managing of paths for unmanned vehicles, wherein the device is configured to be communicatively coupled with the unmanned vehicles, wherein the device comprises:

a communication device configured for:

receiving a plurality of heterogeneous information from a plurality of sensors associated with a plurality of unmanned vehicles, wherein the plurality of sensors is configured for generating the plurality of heterogeneous information of an environment from a plurality of field of views of the plurality of sensors, wherein a heterogeneity of the plurality of heterogeneous information is based on the plurality of field of views, wherein the plurality of field of views is hierarchically nested based on a hierarchical order of the plurality of unmanned vehicles, wherein the plurality of heterogeneous information is hierarchically nested based on hierarchical nesting of the plurality of field of views, wherein a primary field of view of a primary sensor associated with a primary unmanned vehicle of a higher hierarchical order includes a secondary field of view of a secondary sensor associated with a secondary unmanned vehicle of a lower hierarchical order, wherein the primary sensor is configured for generating primary information of the plurality of heterogeneous information associated with the environment from the primary field of view and the secondary sensor is configured for generating secondary information of the plurality of heterogeneous information associated with the environment from the secondary field of view, wherein the primary information includes the secondary information based on the hierarchical nesting of the plurality of field of views, wherein the plurality of sensors comprises at least one moving sensor and at least one stationary sensor, wherein the at least one moving sensor is mounted on at least one unmanned vehicle of the plurality of unmanned vehicles, wherein the at least one moving sensor traverses the environment based on the traversing of the at least one unmanned vehicle of the plurality of unmanned vehicles, wherein the at least one stationary sensor is stationarily placed in the environment; and transmitting a plurality of commands to the plurality of unmanned vehicles, wherein the plurality of unmanned vehicles is configured for traversing the environment based on the plurality of commands, wherein the plurality of unmanned vehicles is configured for performing at least one mission based on the traversing;

a processing device communicatively coupled with the communication device, the processing device is configured for:
  integrating the plurality of heterogeneous information;
  generating integrated information of the environment based on the integrating;
  analyzing the integrated information based on a plurality of paths assigned to the plurality of unmanned vehicles for performing the at least one mission;
  determining an adjustment required to be made in the plurality of paths by the plurality of unmanned vehicles based on the analyzing; and
  generating the plurality of commands for the plurality of unmanned vehicles based on the determining of the adjustment; and a storage device communicatively coupled with the processing device, wherein the storage device is configured for storing the plurality of paths assigned to the plurality of unmanned vehicles for performing the at least one mission;

the integrating of the plurality of heterogeneous information comprises integrating the plurality of heterogeneous information using at least one machine learning model, wherein the at least one machine learning model is trained to integrate heterogeneous information, wherein the generating of the integrated information is further based on the integrating of the plurality of heterogeneous information using the at least one machine learning model;

the plurality of sensors is configured for detecting an appearance of at least one object in the environment from the plurality of field of views based on the traversing of the environment by the plurality of unmanned vehicles, wherein the generating of the plurality of heterogeneous information is further based on the detecting; and receiving at least one sensor configuration associated with at least one sensor of the plurality of sensors from at least one user device, wherein the processing device is further configured for:
  analyzing the at least one sensor configuration;
  determining a modification in at least one field of view of the at least one sensor based on the analyzing of the at least one sensor configuration; and
  generating a field of view modification command for the at least one sensor based on the determining of the modification, wherein the at least one sensor is configured for modifying the at least one field of view based on the field of view modification command.

2. The device of claim 1, wherein the generating of the plurality of heterogeneous information comprises generating the plurality of heterogeneous information with a plurality of information characteristics, wherein the heterogeneity of the plurality of heterogeneous information is further based on a dissimilarity between the plurality of information characteristics of the plurality of heterogeneous information.

3. The device of claim 1, wherein the storage device is further configured for storing the plurality of heterogeneous information and the integrated information in a ledger.

4. The device of claim 1, wherein the communication device is further configured for receiving a mission initiation request for initiating the performing of the at least one mission from at least one user device, wherein the storage device is further configured for retrieving the plurality of paths associated with the plurality of unmanned vehicles.

5. The device of claim 4, wherein the processing device is further configured for:
  analyzing the plurality of paths based on the retrieving;
  assigning the plurality of unmanned vehicles based on the analyzing the plurality of paths; and
  determining the hierarchical order based on the assigning of the plurality of unmanned vehicles, wherein the hierarchical nesting of the plurality of field of views is further based on the determining of the hierarchical order.

6. The device of claim 1, wherein the plurality of sensors is configured for performing a plurality of functions, wherein the generating of the plurality of heterogeneous information is based on the performing of the plurality of functions, wherein the heterogeneity of the plurality of heterogeneous information is further based on a dissimilarity between the plurality of functions, wherein the processing device is further configured for assigning the plurality of functions to the plurality of unmanned vehicles based on the hierarchical order of the plurality of unmanned vehicles, wherein the plurality of heterogeneous information is hierarchically nested based on the assigning.

7. The device of claim 1, wherein the plurality of field of views of the plurality of sensors covers a plurality of portions of the environment, wherein the generating of the plurality of heterogeneous information comprises generating the plurality of heterogeneous information of the plurality of portions of the environment, wherein the heterogeneity of the plurality of heterogeneous information is further based on a dissimilarity between the plurality of portions of the environment.

8. A device for facilitating managing of paths for unmanned vehicles, wherein the device is configured to be communicatively coupled with the unmanned vehicles, wherein the device comprises:
  a communication device configured for:
    receiving a plurality of heterogeneous information from a plurality of sensors associated with a plurality of unmanned vehicles, wherein the plurality of sensors is configured for generating the plurality of heterogeneous information of an environment from a plurality of field of views of the plurality of sensors, wherein a heterogeneity of the plurality of heterogeneous information is based on the plurality of field of views, wherein the plurality of field of views is hierarchically nested based on a hierarchical order of the plurality of unmanned vehicles, wherein the plurality of heterogeneous information is hierarchically nested based on hierarchical nesting of the plurality of field of views, wherein a primary field of view of a primary sensor associated with a primary unmanned vehicle of a higher hierarchical order includes a secondary field of view of a secondary sensor associated with a secondary unmanned vehicle of a lower hierarchical order, wherein the primary sensor is configured for generating primary information of the plurality of heterogeneous information associated with the environment from the primary field of view and the secondary sensor is configured for generating secondary information of the plurality of heterogeneous information associated with the environment from the secondary field of view, wherein the primary information includes the secondary information based on the hierarchical nesting of the plurality of field of views, wherein the plurality of sensors comprises at least one moving sensor and at least one stationary sensor, wherein the at least one moving sensor is mounted on at least one unmanned vehicle of the plurality of unmanned vehicles, wherein the at least one moving sensor traverses the environment based on the traversing of the at least one unmanned vehicle of the plurality of unmanned vehicles, wherein the at least one stationary sensor is stationarily placed in the environment; and transmitting a plurality of commands to the plurality of unmanned vehicles, wherein the plurality of unmanned vehicles is configured for traversing the environment based on the plurality of commands, wherein the plurality of unmanned vehicles is configured for performing at least one mission based on the traversing;

a processing device communicatively coupled with the communication device, the processing device is configured for:

integrating the plurality of heterogeneous information;

generating integrated information of the environment based on the integrating;

analyzing the integrated information based on a plurality of paths assigned to the plurality of unmanned vehicles for performing the at least one mission;

determining an adjustment required to be made in the plurality of paths by the plurality of unmanned vehicles based on the analyzing; and generating the plurality of commands for the plurality of unmanned vehicles based on the determining of the adjustment; and a storage device communicatively coupled with the processing device, wherein the storage device is configured for storing the plurality of paths assigned to the plurality of unmanned vehicles for performing the at least one mission;

the integrating of the plurality of heterogeneous information comprises integrating the plurality of heterogeneous information using at least one machine learning model, wherein the at least one machine learning model is trained to integrate heterogeneous information, wherein the generating of the integrated information is further based on the integrating of the plurality of heterogeneous information using the at least one machine learning model;

the plurality of sensors is configured for detecting a value of at least one environmental condition of the environment from the plurality of field of views based on the traversing of the environment by the plurality of unmanned vehicles, wherein the generating of the plurality of heterogeneous information is further based on the detecting; and receiving at least one sensor configuration associated with at least one sensor of the plurality of sensors from at least one user device, wherein the processing device is further configured for:

analyzing the at least one sensor configuration;

determining a modification in at least one field of view of the at least one sensor based on the analyzing of the at least one sensor configuration; and generating a field of view modification command for the at least one sensor based on the determining of the modification, wherein the at least one sensor is configured for modifying the at least one field of view based on the field of view modification command.

9. The device of claim 8, wherein the generating of the plurality of heterogeneous information comprises generating the plurality of heterogeneous information with a plurality of information characteristics, wherein the heterogeneity of the plurality of heterogeneous information is further based on a dissimilarity between the plurality of information characteristics of the plurality of heterogeneous information.

10. The device of claim 8, wherein the plurality of sensors is configured for performing a plurality of functions, wherein the generating of the plurality of heterogeneous information is based on the performing of the plurality of functions, wherein the heterogeneity of the plurality of heterogeneous information is further based on a dissimilarity between the plurality of functions, wherein the processing device is further configured for assigning the plurality of functions to the plurality of unmanned vehicles based on the hierarchical order of the plurality of unmanned vehicles, wherein the plurality of heterogeneous information is hierarchically nested based on the assigning.

* * * * *